US009064264B2

(12) United States Patent
Reitsma et al.

(10) Patent No.: US 9,064,264 B2
(45) Date of Patent: Jun. 23, 2015

(54) PREDICTING VISIBILITY OF CONTENT ITEMS (75) Inventors: Paul Schelte Albert Reitsma, Marina del Rey, CA (US); Thomas J. Murray, IV, Culver City, CA (US); Peng Zhang, Los Angeles, CA (US)

(73) Assignee: Google Inc., Mountain View, CA (US)

( * ) Notice: Subject to any disclaimer, the term of this patent is extended or adjusted under 35 U.S.C. 154(b) by 532 days.

(21) Appl. No.: 13/546,978

(22) Filed: Jul. 11, 2012

(65) Prior Publication Data
US 2014/0019262 A1  Jan. 16, 2014

(51) Int. Cl.
G06Q 30/02  (2012.01)
(52) U.S. Cl.
CPC ............ G06Q 30/02 (2013.01); G06Q 30/0241 (2013.01)
(58) Field of Classification Search
CPC .......................... G06Q 30/02; G06Q 30/0241
USPC ............... 705/14.71, 14.73; 709/217
See application file for complete search history.

(56) References Cited

U.S. PATENT DOCUMENTS

| | | | |
|---|---|---|---|
| 6,813,039 B1 | 11/2004 | Silverbrook et al. | |
| 8,880,438 B1 * | 11/2014 | Liu et al. ........................ | 706/12 |
| 2003/0142847 A1 | 7/2003 | Rhoads | |
| 2005/0046901 A1 | 3/2005 | Silverbrook et al. | |
| 2005/0065908 A1 | 3/2005 | Silverbrook et al. | |
| 2006/0212350 A1 | 9/2006 | Ellis et al. | |
| 2007/0070373 A1 | 3/2007 | Silverbrook et al. | |
| 2007/0204223 A1 | 8/2007 | Bartels et al. | |
| 2009/0048928 A1 | 2/2009 | Gross | |
| 2011/0055023 A1 * | 3/2011 | McNeeley et al. ......... | 705/14.72 |
| 2011/0228336 A1 | 9/2011 | Silverbrook et al. | |

FOREIGN PATENT DOCUMENTS

| | | |
|---|---|---|
| EP | 1222521 | 5/2000 |
| WO | WO 01/13253 | 2/2001 |
| WO | WO 01/27838 | 4/2001 |

(Continued)

OTHER PUBLICATIONS

International Search Report and Written Opinion in International Application No. PCT/US2013/050061, mailed Nov. 1, 2013, 12 pages.

(Continued)

*Primary Examiner* — John G Weiss
*Assistant Examiner* — Adam Chornesky
(74) *Attorney, Agent, or Firm* — Fish & Richardson P.C.

(57) ABSTRACT

Methods, systems, and apparatus, including computer programs encoded on a computer-readable storage medium, and including a method for predicting visibility of web pages. The method comprises identifying web pages that include slots for presenting content. The method further comprises, for each slot, creating a fingerprint based on a URL associated with the page and structural information associated with the slot's location on the page, determining a likelihood of the slot being visible when the web page is initially presented, the likelihood in the form of a predictive model, and saving the fingerprint and predictive model in a data structure. The method further comprises receiving a request for content from a web page, creating fingerprints associated with the web page, and comparing the fingerprints to fingerprints in the data structure. When a matching fingerprint is located, prediction data is used that is associated with a matching fingerprint for the web page.

10 Claims, 4 Drawing Sheets (56) References Cited

FOREIGN PATENT DOCUMENTS

| WO | 2008/046130 | 4/2008 |
| WO | 2009/012235 | 1/2009 |
| WO | 2010/135001 | 11/2010 |

OTHER PUBLICATIONS

International Preliminary Report on Patentability in International Application No. PCT/US2013/050061, mailed Jan. 22, 2015, 6 pages.

* cited by examiner

PREDICTING VISIBILITY OF CONTENT ITEMS

BACKGROUND

This specification relates to information presentation.

The Internet provides access to a wide variety of resources. For example, video and/or audio files, as well as web pages for particular subjects or particular news articles, are accessible over the Internet. Access to these resources presents opportunities for other content (e.g., advertisements) to be provided with the resources. For example, a web page can include slots in which content can be presented. These slots can be defined in the web page or defined for presentation with a web page, for example, along with search results.

Content item slots can be allocated to content sponsors as part of a reservation system, or in an auction. For example, content sponsors can provide bids specifying amounts that the sponsors are respectively willing to pay for presentation of their content. In turn, an auction can be performed, and the slots can be allocated to sponsors according, among other things, to their bids and/or the relevance of the sponsored content to content presented on a page hosting the slot or a request that is received for the sponsored content.

SUMMARY

In general, one innovative aspect of the subject matter described in this specification can be implemented in methods that include a computer-implemented method for predicting visibility of web pages. The method comprises identifying a plurality of web pages, each web page including one or more slots for presenting content served by a serving system in response to presentation of the web page to a user. The method further comprises, for each slot on each of the plurality of web pages, creating a fingerprint based at least in part on a URL associated with the web page and structural information at least indicating where the slot is located on the page, determining a predictive model that includes indicating a likelihood of the slot being visible when the web page is initially presented to the user, and saving the fingerprint in a data structure at a first level including creating an entry that includes the fingerprint and the predictive model or a pointer to the predictive model. The method further comprises receiving a request for content from a web page. The method further comprises determining that the web page does not have reliable prediction data associated with it. The method further comprises creating one or more fingerprints associated with the web page from which the request is received that are similar to fingerprints saved in the data structure. The method further comprises comparing the one or more fingerprints created for the web page from which the request is received to the fingerprints in the data structure, and when a matching fingerprint is located, using prediction data that is associated with the matching fingerprint for the web page that does not have reliable prediction data.

These and other implementations can each optionally include one or more of the following features. The method can further comprise grouping ones of the fingerprints that have a logical relation and similar structure, creating a group fingerprint for each group, and saving the group fingerprint in the data structure at a second level including creating an entry that includes the group fingerprint and a predictive model associated with the group, where comparing the one or more fingerprints includes comparing fingerprints at the first level prior to comparing fingerprints at a second level for matches. The method can further comprise, for each web page in the plurality of web pages: repeating the grouping, fingerprinting and saving a predetermined number of times including grouping previously created groups that have a logical relation and similar structure and storing new groups at an appropriate hierarchical level in the data structure, or repeating the grouping, fingerprinting and saving a non-fixed number of times until an improvement in prediction capability, based on analyzing test data, falls below a threshold value, where comparing the one or more fingerprints includes comparing fingerprints in level order from most specific to least specific for matches. Creating a fingerprint can be based at least in part on a URL associated with the page, and structural information can further include creating a fingerprint at the first level from the URL and a page structure hash. Creating a fingerprint at the second level can include creating a fingerprint from a shortened version of the URL and the page structure hash. The method can further comprise indexing the data structure using the fingerprints. Using the prediction data can further comprise using the prediction data to determine which content item to serve responsive to the request. The method can further comprise creating a type fingerprint based at least in part on a type associated with the slot, determining a type likelihood of the slot being visible when the web page is initially presented to the user using a respective type, the likelihood being of the form of a type prediction, and saving the type fingerprint in the data structure at another level. The type can be selected from a group comprising text ads, image ads, graphics ads, and combinations thereof and the other level is a zero level. Using the prediction data can include using the prediction data to adjust a bid in an auction for selecting an advertisement for an advertisement slot.

Particular implementations may realize none, one or more of the following advantages. For example, visibility likelihoods associated with fingerprints of characteristic ad blocks can provide immediate and accurate prediction for new ad blocks on new or never-before-seen web pages when those pages are structurally similar to previously-seen pages e.g., from the same web site.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This document describes methods, processes and systems for generating predictions for visibility of content item slots (e.g., advertisement (or "ad") blocks). For example, the predictions can be made for slots having insufficient prediction data, such slots that are relatively new or on never-seen-before or rarely-seen web pages. In some implementations, the predictions can be made based on visibility data associated with web pages with slots having similar fingerprints to the slots for which a prediction is needed, the fingerprints representing, for example, the characteristics of the slot. The predictions can then be used in selecting among eligible content items to be served in the slots, such as part of an auction. For example, some content sponsors may define campaigns for which impressions of the associated content are to appear above the fold, e.g., the part of a web page that is visible without scrolling or paging down. The content sponsor's content, which may have higher bids based on their visibility requirements, can be selected (e.g., based in part on visibility predictions) so as to take advantage of the visibility of the given impression opportunity.

A fingerprint, as used herein, includes a combination of elements that define at least the characteristics of the structure and the content of a slot. Fingerprints associated with slots can include or be based on different parameters, such as universal resource locators (URLs), structural information (e.g., whether the slot appears in a story, a blog, or some other content structure), the type of content (e.g., text, image, video, etc.), and other parameters. One example fingerprint is "example.com/specific_page, story structure, side bar" where "example.com/specific_page" is the URL, "story structure" is the structure information, and "side bar" is the type of content. In some implementations, fingerprints can be stored in a hierarchical structure (e.g., an inverted tree) to represent hierarchically dependent levels of information. For example, the lowest level (e.g., level 1, or leaf nodes in the tree) can contain more specific fingerprints than non-leaf nodes in levels 2 and higher. In some implementations, level N+1 nodes (e.g., level 2 fingerprints) can be generated by aggregating information of associated level N nodes (e.g., level 1 fingerprints). In some implementations, slot types can be used to further differentiate nodes in the tree, e.g., to create sub-nodes representing each of different types of content, such as at level zero.

The fingerprints can be generated and stored in a hierarchical structure until needed. For example, a web page may be created that includes a new ad block, such as an ad block that can present an ad in a highly visible way and/or above the fold. Because the ad block is new, there may be insufficient historical visibility information available for the ad block. As a result, selecting ads to fill the ad block, based on the ad block's visibility information alone, may exclude ads that have been designated to appear above the fold. In this example, the structure can be accessed to obtain visibility prediction information for the new ad block based on ad blocks that may have the same or a similar characteristic fingerprint (e.g., URL, structure, ad type). A match can first be attempted with leaf nodes in the tree, e.g., having more specific URLs. If no match is found at the leaf nodes, then a match can be attempted using nodes at other levels in the tree, e.g., having more generalized, less specific URLs. As a result, a predicted visibility for the new ad block can be determined if a matching fingerprint is available in the hierarchical structure. Then, eligible content for filling the slots can include ads, for example, in campaigns that include presentation parameters indicating that impressions of the advertisements must be above the fold line.

Fingerprints used in this way can provide immediate and accurate visibility predictions for slots on never-before-seen web pages when those pages are structurally similar to previously-seen pages, for example, from the same web site. For example, the web page "anytowntimes.com/new-story.html" may never have been seen by a user before, but it may use the same layout as existing web pages "anytowntimes.com/yesterdays-story.html" and "anytowntimes.com/some-other-story.html." A visibility model, including fingerprints of slots of web pages in that domain, can be generated for the existing anytowntimes.com's web pages based on their layout. The visibility model can then be used to make a visibility prediction for new slots in anytowntimes.com/this-is-a-new-story.html. Fingerprints can also be used for more efficient modeling of long-tail content, e.g., video-sharing web sites having similar layouts and which each may receive few views per day, but together may account for a large number of content impressions. Using fingerprints to make visibility predictions can take advantage of regularities in a domain's data to construct a hierarchy of overlapping prediction models with increasing degrees of simplification. When a prediction is required, e.g., for an above-the-fold content request, existing fingerprints can be searched from most-specific to least-specific until sufficient historical data is found to generate an effective visibility predictive model. In some implementations, visibility predictions can be used to adjust a bid in an auction for selecting content (e.g., selecting an advertisement for an advertisement slot). Other uses of predictions are possible, such as setting parameters in the definition of campaigns (e.g., advertising campaigns) by a content sponsor.

Figure 1:
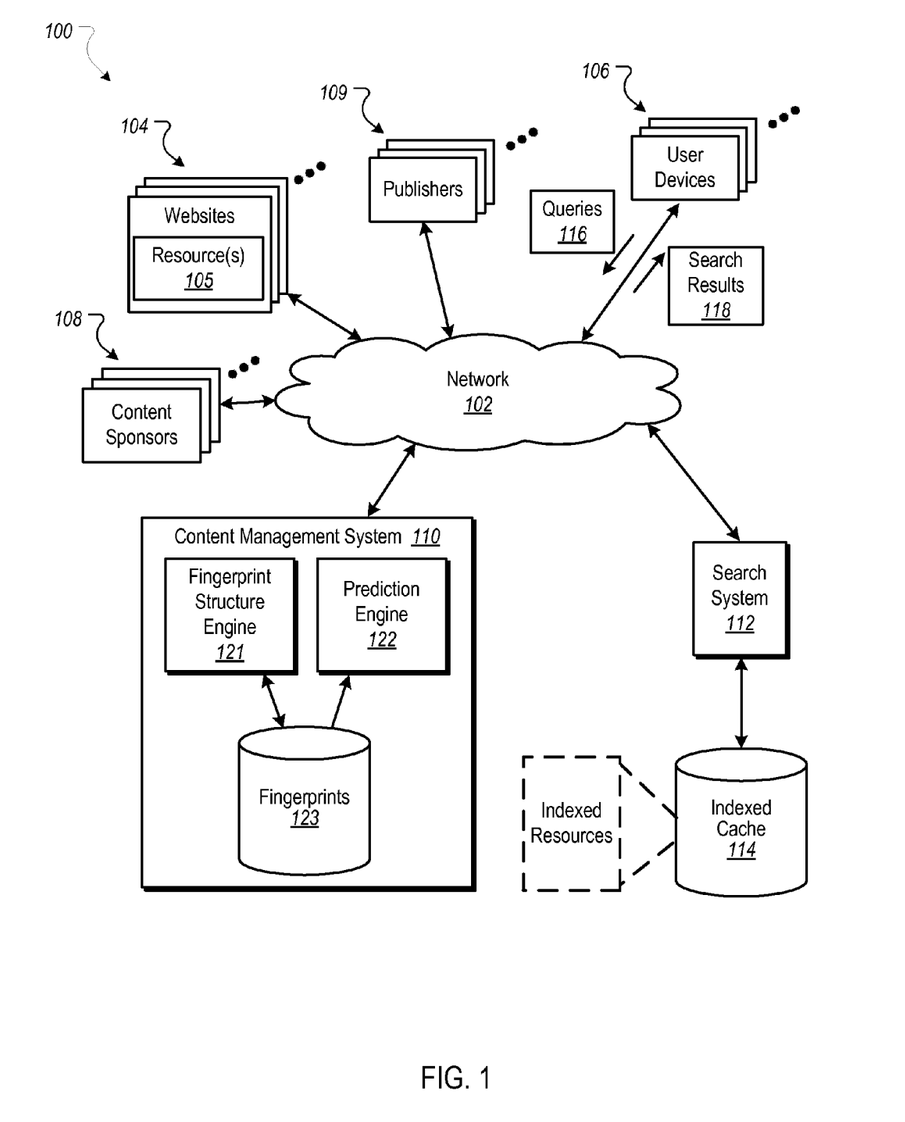
FIG. 1 is a block diagram of an example environment for delivering content.

FIG. 1 is a block diagram of an example environment 100 for delivering content. The example environment 100 includes a content management system 110 for selecting and providing content in response to requests for content. The example environment 100 includes a network 102, such as a local area network (LAN), a wide area network (WAN), the Internet, or a combination thereof. The network 102 connects websites 104, user devices 106, content sponsors 108 (e.g., advertisers), content publishers 109, and the content management system 110. The example environment 100 may include many thousands of websites 104, user devices 106, content sponsors 108 and content publishers 109.

In some implementations, the content management system 110 can include plural engines and at least one data store. For example, a fingerprint structure engine 121 can process existing web pages, each web page including one or more slots for presenting content served by the content management system 110 or some other content serving system in response to presentation of the web page to a user. For each slot on a web page, the fingerprint structure engine 121 can create a fingerprint associated with the page, determine a likelihood (e.g., a prediction) of given slot being visible when the web page is initially presented to the user, and save the fingerprint in a data structure. The fingerprint can be based at least in part on a URL associated with the page and structural information for where the one or more slots are located, e.g., the position of the slots on the web page. When the fingerprint is saved, e.g., in a fingerprints data base 123, the fingerprint can be stored at a first level of a structure, including creating an entry that includes the fingerprint and a visibility predictive model, a pointer to the visibility predictive model or data associated with the visibility prediction. The fingerprints data base 123 can also store fingerprints at higher levels of the structure, each of which can contain less specific fingerprint information aggregated from more specific fingerprint information at the lower levels.

A prediction engine 122 can use the fingerprints data base 123, for example, to generate a prediction for a new slot, e.g., after receipt of a request for content from a web page that does not already have (or has insufficient) visibility data associated with it. For example, the prediction engine 122 can create one or more fingerprints associated with the new slots that are similar to fingerprints stored in the fingerprints data base 123 that were created from slots for which historical visibility information is available. The prediction engine 122 can then compare the one or more fingerprints to fingerprints in the data structure, and when a matching fingerprint is located, use prediction data that is associated with a matching fingerprint for the slot that does not have prediction data.

In some implementations, the content management system 110 includes a request handler that can receive a request for content from a user, identify one or more eligible content items, and provide a content item responsive to the request.

A website 104 includes one or more resources 105 associated with a domain name and hosted by one or more servers. An example website is a collection of web pages formatted in hypertext markup language (HTML) that can contain text, images, multimedia content, and programming elements, such as scripts. Each website 104 can be maintained by a content publisher, which is an entity that controls, manages and/or owns the website 104.

A resource 105 can be any data that can be provided over the network 102. A resource 105 can be identified by a resource address that is associated with the resource 105. Resources include HTML pages, word processing documents, portable document format (PDF) documents, images, video, and news feed sources, to name only a few. The resources can include content, such as words, phrases, images, video and sounds, that may include embedded information (such as meta-information hyperlinks) and/or embedded instructions (such as JavaScript scripts).

A user device 106 is an electronic device that is under control of a user and is capable of requesting and receiving resources over the network 102. Example user devices 106 include personal computers, mobile communication devices (e.g., smartphones), and other devices that can send and receive data over the network 102. A user device 106 typically includes one or more user applications, such as a web browser, to facilitate the sending and receiving of data over the network 102.

A user device 106 can request resources 105 from a website 104. In turn, data representing the resource 105 can be provided to the user device 106 for presentation by the user device 106. The data representing the resource 105 can also include data specifying a portion of the resource or a portion of a user display, such as a presentation location of a pop-up window or a slot of a third-party content site or web page, in which content can be presented. These specified portions of the resource or user display are referred to as slots (e.g., ad slots).

To facilitate searching of these resources, the environment 100 can include a search system 112 that identifies the resources by crawling and indexing the resources provided by the content publishers on the websites 104. Data about the resources can be indexed based on the resource to which the data corresponds. The indexed and, optionally, cached copies of the resources can be stored in an indexed cache 114.

User devices 106 can submit search queries 116 to the search system 112 over the network 102. In response, the search system 112 accesses the indexed cache 114 to identify resources that are relevant to the search query 116. The search system 112 identifies the resources in the form of search results 118 and returns the search results 118 to the user devices 106 in search results pages. A search result 118 is data generated by the search system 112 that identifies a resource that is responsive to a particular search query, and includes a link to the resource. In some implementations, the content management system 110 can generate search results 118 using information (e.g., identified resources) received from the search system 112. An example search result 118 can include a web page title, a snippet of text or a portion of an image extracted from the web page, and the URL of the web page. Search results pages can also include one or more slots in which other content items (e.g., ads) can be presented. In some implementations, slots on search results pages or other web pages can include content slots for content items that have been provided as part of a reservation process. In a reservation process, a publisher and a content item sponsor enter into an agreement where the publisher agrees to publish a given content item (or campaign) in accordance with a schedule (e.g., provide 1000 impressions by date X) or other publication criteria. Some slots for content items can be included on web pages that may or may not be displayed as the result of selecting from a set of search results. In some implementations, content items that are selected to fill the requests for content slots can be selected based, at least in part, on a likelihood that the content items will appear above the fold and/or are likely to be seen by the user when the web page is displayed. For new web pages for which visibility information is not available, visibility information for web pages having similar ad blocks can be used to generate a prediction.

When a resource 105, search results 118 and/or other content are requested by a user device 106, the content management system 110 receives a request for content. The request for content can include characteristics of the slots that are defined for the requested resource or search results page, and can be provided to the content management system 110.

For example, a reference (e.g., URL) to the resource for which the slot is defined, a size of the slot, and/or media types that are available for presentation in the slot can be provided to the content management system 110. Similarly, keywords associated with a requested resource ("resource keywords") or a search query 116 for which search results are requested can also be provided to the content management system 110 to facilitate identification of content that is relevant to the resource or search query 116.

Based at least in part on data included in the request, the content management system 110 can select content that is eligible to be provided in response to the request ("eligible content items"). For example, eligible content items can include eligible ads having characteristics matching the characteristics of ad slots and that are identified as relevant to specified resource keywords or search queries 116. The characteristics of the ads can include, for example, presentation criteria specified by a content sponsor that their content must appear above the fold. As such, that content sponsor's ads can be selected as eligible content items for new ad blocks not having historical visibility information, but based on one of more fingerprints of similarly-structured ad blocks from which visibilities can be predicted, as described in this document.

The content management system 110 can select from the eligible content items that are to be provided for presentation in slots of a resource or search results page based at least in part on results of an auction (or by some other selection process). For example, for the eligible content items, the content management system 110 can receive offers from content sponsors 108 and allocate the slots, based at least in part on the received offers (e.g., based on the highest bidders at the conclusion of the auction or based on other criteria, such as those related to satisfying open reservations). The offers represent the amounts that the content sponsors are willing to pay for presentation (or selection) of their content with a resource or search results page. For example, an offer can specify an amount that a content sponsor is willing to pay for each 1000 impressions (i.e., presentations) of the content item, referred to as a CPM bid. Alternatively, the offer can specify an amount that the content sponsor is willing to pay for a selection (i.e., a click-through) of the content item or a conversion following selection of the content item. For example, the selected content item can be determined based on the offers alone, or based on the offers of each content sponsor being multiplied by one or more factors, such as quality scores derived from content performance, landing page scores, predicted visibility (e.g., above the fold), and/or other factors.

A conversion can be said to occur when a user performs a particular transaction or action related to a content item provided with a resource or search results page. What constitutes a conversion may vary from case-to-case and can be determined in a variety of ways. For example, a conversion may occur when a user clicks on a content item (e.g., an ad), is referred to a web page, and consummates a purchase there before leaving that web page. A conversion can also be defined by a content provider to be any measurable/observable user action, such as downloading a white paper, navigating to at least a given depth of a website, viewing at least a certain number of web pages, spending at least a predetermined amount of time on a web site or web page, registering on a website, experiencing media, or performing a social action regarding a content item (e.g., an ad), such as republishing or sharing the content item. Other actions that constitute a conversion can also be used.

In some implementations, the likelihood that a conversion will occur can be improved, such as by serving content that is more likely to be of interest to the user. For example, content items (e.g., ads) that are served can be selected in part based on whether the ad is likely to appear above the fold.

Figure 2:
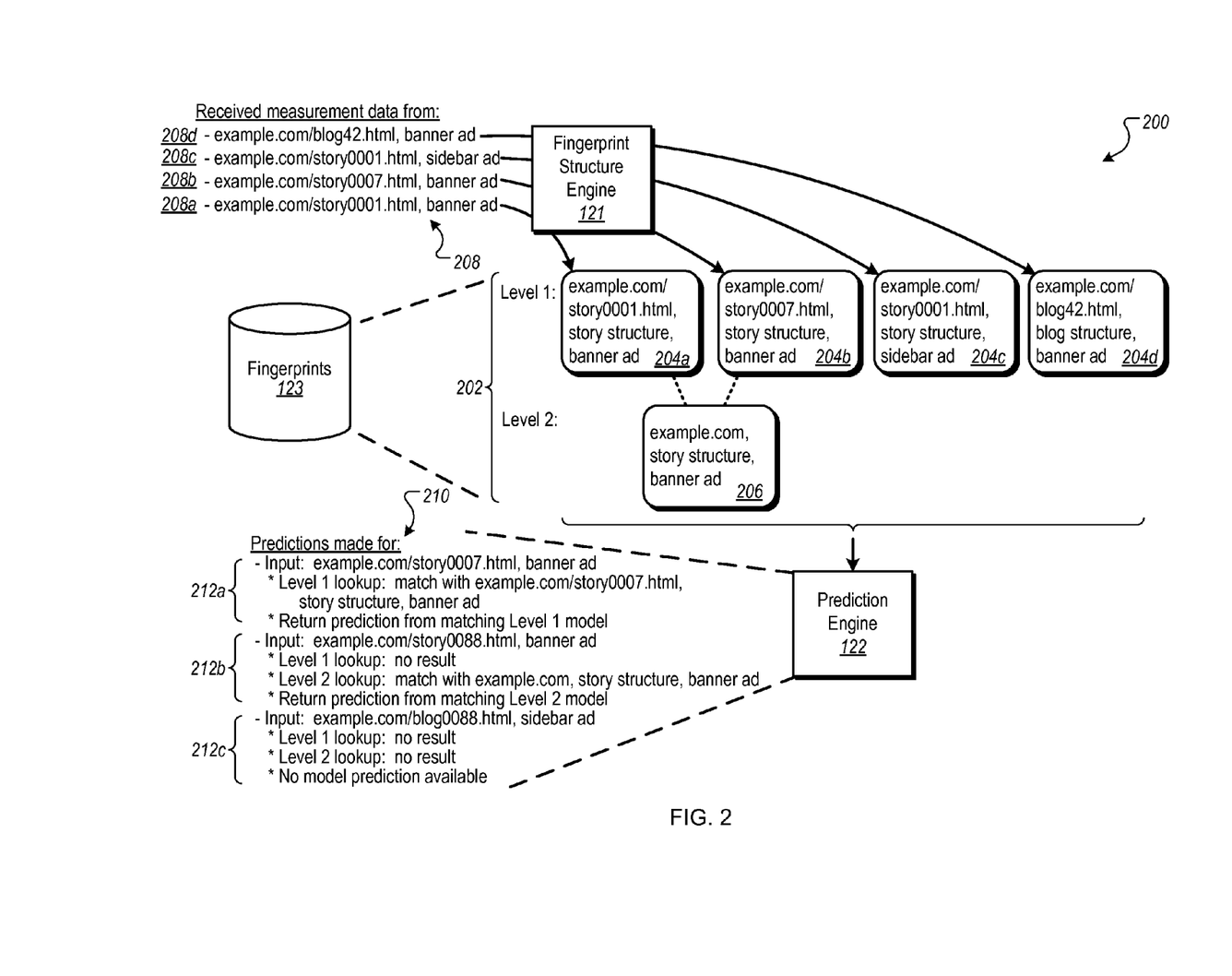
FIG. 2 shows an example system that uses a structure of fingerprint information to predict visibility for new slots.

FIG. 2 shows an example system 200 that uses a structure 202 of fingerprint information to predict visibility for new slots. For example, the structure 202 includes level 1 nodes 204a-204d, and a level 2 node 206, that the fingerprint structure engine 121 can create from received measurement data 208 associated with slots for which visibility information is known. The level 1 nodes 204a-204d, for example, can be created directly from the received measurement data 208a-208d, respectively. For example, story pages can have a story structure (e.g., in nodes 204a-204c) and blog pages can have a blog structure (e.g., in node 204d). The fingerprint structure engine 121 can also store a visibility prediction value, e.g., based on the received measurement data for the corresponding content item. In some implementations, structure 202 can include level 0 nodes, e.g., that each contain prediction values for different types of content format, or that provide differentiation of information in the associated level 1 node for other reasons (e.g., corresponding to whether the request for the ad is from a mobile device or a non-mobile device).

A level 2 node 204 can be created from the level 1 nodes 204a and 204b by generalizing the fingerprints associated with the level 1 nodes, such as creating a fingerprint having a similar URL prefix (e.g., example.com), the same story structure, and the same content type. In this example, the URL example.com in the fingerprint for the level 2 node 204 groups the two longer URLs example.com/story0001.html and example.com/story0007.html that have the same URL prefix example.com. Other level 2 nodes are possible using information not included in the received measurement data 208. Moreover, higher-level (and more generalized) nodes can be created, e.g., level 3 nodes having fingerprints based on the fingerprints of two or more level 2 nodes.

Example predictions 210 include three scenarios 212a-212c in which visibility predictions for new slots can be made using information from the structure 202. For example, the prediction engine 122 can receive as input a fingerprint associated with a given new slot and return a predicted visibility based on fingerprints stored in the structure 202. In some implementations, the prediction engine 122 can construct the input fingerprint at least in part by using the URL and structural information for the new slot, e.g., by examining html or other code associated with the slot to determine where on a web page the slot appears. The form of the constructed fingerprint can be slightly different from the input fingerprints shown in scenarios 212a-212c in which the structure (e.g., story vs. blog) is embedded in the URL.

For example, scenario 212a includes an input fingerprint "example.com/story0007.html, banner ad" for a new slot. To attempt to determine the new slot's visibility (e.g., above the fold or not), the prediction engine 122 can perform a level 1 look-up, e.g., locating node 204b having the same fingerprint, and returning a prediction stored with that node.

Scenario 212b, for example, includes an input fingerprint "example.com/story0088.html, banner ad." The prediction engine 122 can perform a level 1 look-up, e.g., not matching any level 1 node. Then, performing a level 2 look-up, the prediction engine 122 can locate the level 2 node 206 having a fingerprint that shares the same URL prefix as the input fingerprint.

Scenario 212c, for example, includes an input fingerprint "example.com/blog0088.html, sidebar ad." The prediction engine 122 can perform a level 1 look-up, e.g., not locating any level 1 nodes having a fingerprint of "example.com/blog0088.html, blog structure, sidebar ad." A level 2 look-up can also fail to find a corresponding fingerprint, as no level 2 nodes have a shortened-URL fingerprint of "example.com, blog structure, sidebar ad." As no level 3 or higher nodes exist, the prediction engine 122 can conclude that no prediction is available. Other methods can be used for making visibility predictions using fingerprint information in the structure 202. Moreover, the structure 202 shows nodes for fingerprints for just one domain, e.g., example.com, but the structure 202 can also include other domains. In some implementations, the domain can be used as index to access only those nodes in the structure that are related to that domain.

Figure 3:
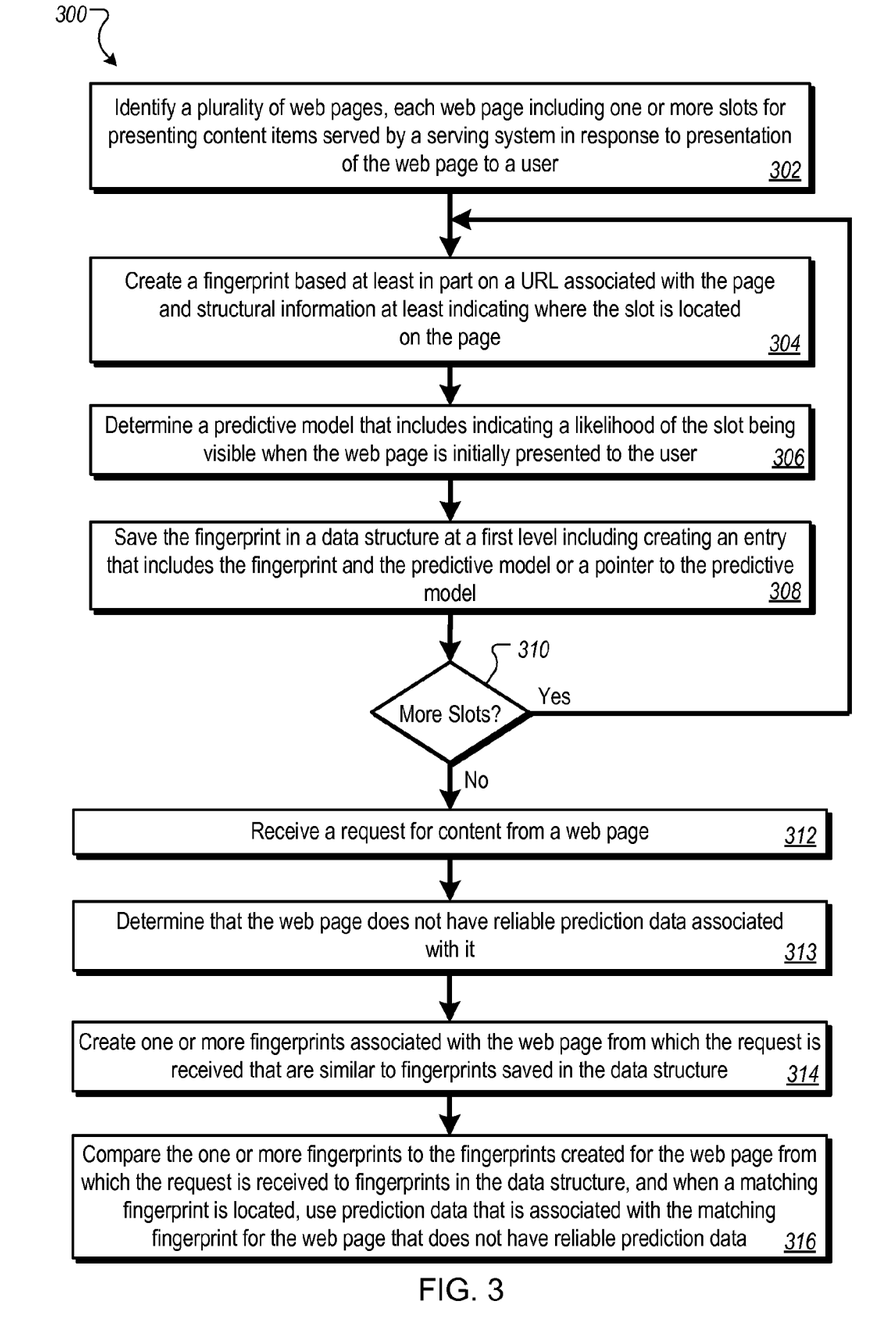
FIG. 3 is a flowchart of an example process for generating predictions for visibility of content slots.

FIG. 3 is a flowchart of an example process 300 for generating predictions for visibility of content slots. The process 300 can be performed by the content management system 110, for example, using the fingerprint structure engine 121 and the prediction engine 122. FIGS. 1 and 2 are used to provide example structures/interfaces associated with the steps of the process 300.

A plurality of web pages is identified, each web page including one or more slots for presenting content served by a content serving system in response to presentation of the web page to a user (302). For example, the fingerprint structure engine 121 can identify received measurement data 208 for web pages in the domain example.com that have visibility information.

For each web page, a fingerprint is created that is based at least in part on a URL associated with the page and structural information at least indicating where the slot is located on the page (304). For example, the fingerprint structure engine 121 can create nodes 204a-204d in the structure 202 based on URL and other information for the web pages in the received measurement data 208. In some implementations, creating a fingerprint based at least in part on a URL associated with the page and structural information further includes creating a fingerprint at the first level from the URL and a page structure hash. For example, the 204a-204d are created in the structure 202 at the first level using the received measurement data 208, and the nodes can include a hash from the page structure (e.g., story, blog, etc.).

For the current web page, a predictive model is determined that includes indicating a likelihood of the slot being visible when the web page is initially presented to the user (306). For example, the likelihood that is determined can be the likelihood of the slot being characterized by a certain state or property during a user session, such as being visible initially or later for some duration of time. The fingerprint structure engine 121, for example, can generate a probability or some other measure that is associated with the likelihood that a content item appearing in the slot will be visible.

The fingerprint is stored in a data structure at a first level including creating an entry that includes the fingerprint and the predictive model or a pointer to the predictive model (308). As an example, the fingerprint structure engine 121 can store the information in the fingerprints data base, e.g., to represent fingerprint nodes in the structure 202. The predictive model can be combined with other data (e.g., the window size of the web browser) to calculate a prediction specific to each impression.

Steps 304-308 are repeated for each webpage (310). For example, other web pages can be processed for the same or different domains in order to populate fingerprint information in the structure 202.

A request for content is received from a web page (312). A determination is made that the web page does not have (or has little or unreliable) prediction data associated with it (313). For example, the content management system 110 can receive a request for content to fill an ad slot (e.g., a new ad block), such as for the ad blocks associated with the scenarios 212a-212c. If the web page is fairly new, for example, there may be no associated visibility prediction data.

One or more fingerprints associated with the web page are created that are similar to fingerprints created for web pages in the plurality of web pages (314). As an example, the prediction engine 122 can use information in the new ad block for "example.com/story0007.html, banner ad" associated with the scenario 212a to create a fingerprint in the same format as the fingerprints stored in the fingerprints data base 123.

The one or more fingerprints are compared to fingerprints in the data structure, and when a matching fingerprint is located, prediction data is used that is associated with a matching fingerprint for the web page that does not have (or needs augmented) prediction data (316). The prediction engine 122, for example, can perform look-ups described above for scenario 212a to identify the node 204b as a matching level 1 node in the structure 202. Prediction data stored with the node 204b can be used as the visibility prediction data for the new slot "example.com/story0007.html, banner ad," e.g., in selecting content items to fill the new ad block.

In some implementations, a process can be used to group entries in the data structure, such as entries that are determined in steps 304-308. For example, entries can be grouped that have a logical relation (e.g., URLs in the example.com domain) and similar structure (e.g., story vs. blog structure), and a group fingerprint can be created for each group of entries. The group fingerprint can be saved in the data structure 202 at a second (e.g., one level higher) level (e.g., node 206), e.g., by creating an entry that includes the group fingerprint and a predictive model associated with that group. The predictive model for the group can be based on the individual predictive models associated with the elements that have been grouped. For example, the predictive model can represent a numerical average of all of the predictive models for each member in the group. Then, at step 316 and/or whenever matching fingerprints are to be located for a given slot (e.g., not having sufficient prediction data), comparing the one or more fingerprints can include comparing of fingerprints for matches at the first level prior to comparing fingerprints at a second level. For example, in scenario 212b, the level 1 look-up performed by the prediction engine 122 does not match any level 1 node. However, performing a level 2 look-up, the prediction engine 122 locates the level 2 node 206 having a fingerprint that shares the same URL prefix as the input fingerprint.

In some implementations, the grouping, fingerprinting and saving can be repeated a predetermined number of times, including grouping previously-created groups that have a logical relation and/or similar structure and storing new groups at an appropriate hierarchical level in the data structure. For example, level two groupings can be grouped into level three groups, such as by combining groups with fingerprints having the same URL prefix. Then, at step 316 and/or whenever matching fingerprints are to be located for a given ad block, comparing one or more fingerprints can include comparing fingerprints in level order from a lowest to highest (e.g., most specific to least specific) for matches. In some implementations, the number of times that fingerprinting and saving are repeated need not be a fixed number. For example, a data structure can be built by continuing to aggregate level N nodes into level N+1 nodes for as long as doing so provides a sufficiently large improvement in prediction capability, e.g., based on analyzing test data.

Figure 4:
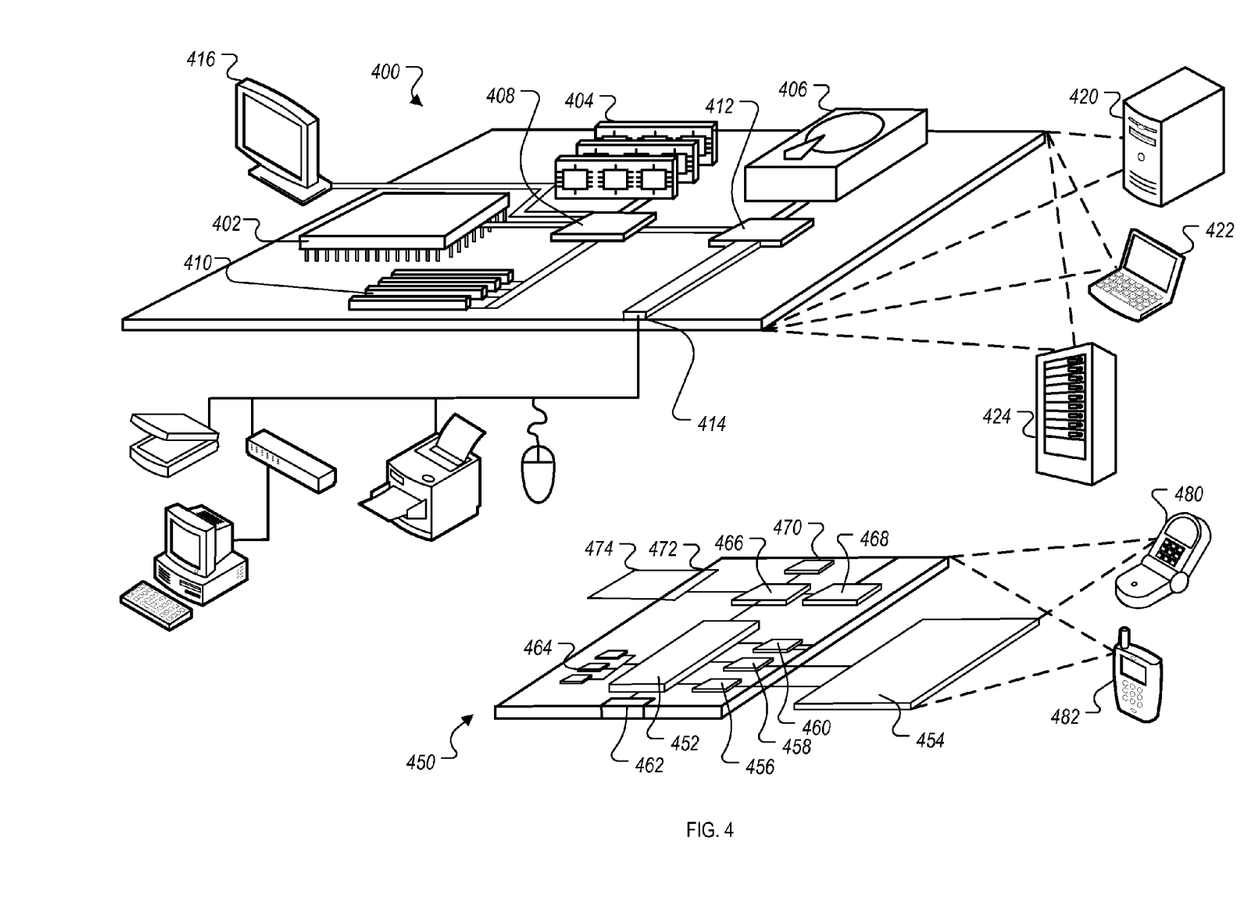
FIG. 4 is a block diagram of an example computer system that can be used to implement the methods, systems and processes described in this disclosure.

FIG. 4 is a block diagram of computing devices 400, 450 that may be used to implement the systems and methods described in this document, as either a client or as a server or plurality of servers. Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smartphones, and other similar computing devices. Computing device 450 is further intended to represent various typically non-mobile devices, such as televisions or other electronic devices with one or more processors embedded therein or attached thereto. The components shown here, their connections and relationships, and their functions, are meant to be exemplary only, and are not meant to limit implementations of the inventions described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a computer-readable medium. In one implementation, the memory 404 is a volatile memory unit or units. In another implementation, the memory 404 is a non-volatile memory unit or units.

The storage device 406 is capable of providing mass storage for the computing device 400. In one implementation, the storage device 406 is a computer-readable medium. In various different implementations, the storage device 406 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 404, the storage device 406, or memory on processor 402.

The high speed controller 408 manages bandwidth-intensive operations for the computing device 400, while the low speed controller 412 manages lower bandwidth-intensive operations. Such allocation of duties is exemplary only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth™, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 can process instructions for execution within the computing device 450, including instructions stored in the memory 464. The processor may also include separate analog and digital processors. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT LCD display or an OLED display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provided in communication with processor 452, so as to enable near area communication of device 450 with other devices. External interface 462 may provide, for example, for wired communication (e.g., via a docking procedure) or for wireless communication (e.g., via Bluetooth™ or other such technologies).

The memory 464 stores information within the computing device 450. In one implementation, the memory 464 is a computer-readable medium. In one implementation, the memory 464 is a volatile memory unit or units. In another implementation, the memory 464 is a non-volatile memory unit or units. Expansion memory 474 may also be provided and connected to device 450 through expansion interface 472, which may include, for example, a subscriber identification module (SIM) card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provide as a security module for device 450, and may be programmed with instructions that permit secure use of device 450. In addition, secure applications may be provided via the SIM cards, along with additional information, such as placing identifying information on the SIM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth™, Wi-Fi, or other such transceiver (not shown). In addition, GPS receiver module 470 may provide additional wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smartphone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
   identifying a plurality of web pages, each web page including one or more slots for presenting content served by a serving system in response to presentation of the web page to a user;
   for each slot on each of the plurality of web pages:
      creating a fingerprint based at least in part on a URL associated with the web page and structural information at least indicating where the slot is located on the page;
      determining a predictive model that includes indicating a likelihood of the slot being visible when the web page is initially presented to the user; and
      saving the fingerprint in a data structure at a first level including creating an entry that includes the fingerprint and the predictive model or a pointer to the predictive model;
   receiving a request for content from a web page;
   determining that the web page does not have reliable prediction data associated with it;
   creating one or more fingerprints associated with the web page from which the request is received that are similar to fingerprints saved in the data structure; and
   comparing the one or more fingerprints created for the web page from which the request is received to the fingerprints in the data structure, and when a matching fingerprint is located, using prediction data that is associated with the matching fingerprint for the web page that does not have reliable prediction data.

2. The method of claim 1 further comprising:
   grouping ones of the fingerprints that have a logical relation and similar structure;
   creating a group fingerprint for each group; and saving the group fingerprint in the data structure at a second level including creating an entry that includes the group fingerprint and a predictive model associated with the group;

wherein comparing the one or more fingerprints includes comparing fingerprints at the first level prior to comparing fingerprints at a second level for matches.

3. The method of claim 2 further comprising:

for each web page in the plurality of web pages:
- repeating the grouping, fingerprinting and saving a predetermined number of times including grouping previously created groups that have a logical relation and similar structure and storing new groups at an appropriate hierarchical level in the data structure; or
- repeating the grouping, fingerprinting and saving a non-fixed number of times until an improvement in prediction capability, based on analyzing test data, falls below a threshold value;

and wherein comparing the one or more fingerprints includes comparing fingerprints in level order from most specific to least specific for matches.

4. The method of claim 3 wherein creating a fingerprint based at least in part on a URL associated with the page and structural information further includes creating a fingerprint at the first level from the URL and a page structure hash.

5. The method of claim 4 wherein creating a fingerprint at the second level includes creating a fingerprint from a shortened version of the URL and the page structure hash.

6. The method of claim 1 further comprising indexing the data structure using the fingerprints.

7. The method of claim 1 wherein using the prediction data further comprises using the prediction data to determine which content item to serve responsive to the request.

8. The method of claim 1 further comprising:
- creating a type fingerprint based at least in part on a type associated with the slot;
- determining a type likelihood of the slot being visible when the web page is initially presented to the user using a respective type, the likelihood being of the form of a type prediction; and
- saving the type fingerprint in the data structure at another level.

9. The method of claim 8 wherein the type is selected from a group comprising text ads, image ads, graphics ads, and combinations thereof and the other level is a zero level.

10. The method of claim 1 wherein using the prediction data includes using the prediction data to adjust a bid in an auction for selecting an advertisement for an advertisement slot.

* * * * *